(12) United States Patent
Miller

(10) Patent No.: US 12,474,236 B2
(45) Date of Patent: Nov. 18, 2025

(54) MULTISTAGE GAS SAMPLING TRAP AND DETECTION OF SULFUROUS SPECIES CONTAMINANT

(71) Applicant: ENTEGRIS, INC., Billerica, MA (US)

(72) Inventor: Charles Miller, Taunton, MA (US)

(73) Assignee: ENTEGRIS, INC., Billerica, MA (US)

( * ) Notice: Subject to any disclaimer, the term of this patent is extended or adjusted under 35 U.S.C. 154(b) by 0 days.

(21) Appl. No.: 18/764,100

(22) Filed: Jul. 3, 2024

(65) Prior Publication Data

US 2024/0361210 A1 Oct. 31, 2024

Related U.S. Application Data

(63) Continuation of application No. 17/737,627, filed on May 5, 2022, now Pat. No. 12,066,360.

(60) Provisional application No. 63/185,812, filed on May 7, 2021.

(51) Int. Cl.
  *G01N 1/22* (2006.01)
  *G01N 30/06* (2006.01)

(52) U.S. Cl.
  CPC ......... *G01N 1/2214* (2013.01); *G01N 1/2247* (2013.01); *G01N 30/06* (2013.01)

(58) Field of Classification Search
  CPC .... G01N 1/2214; G01N 1/2247; G01N 30/06; G01N 30/08; G01N 1/22; G01N 1/2273; G01N 30/14; G01N 30/96; G01N 2030/143; G01N 2030/146; G01N 2030/062; G01N 2030/067

USPC ..... 73/23.41, 31.07, 863.21; 422/83, 88, 89; 95/90, 116, 128; 96/108

See application file for complete search history.

(56) References Cited

U.S. PATENT DOCUMENTS

| | | |
|---|---|---|
| D775,342 S | 12/2016 | Leblanc et al. |
| 10,031,114 B2 | 7/2018 | Moulton et al. |
| 10,415,381 B2 | 9/2019 | Samec et al. |
| 2005/0120775 A1 | 6/2005 | Grayfer et al. |
| 2012/0234114 A1 | 9/2012 | Coleman et al. |
| 2013/0136680 A1 | 5/2013 | Nagayasu et al. |
| 2017/0354926 A1 | 12/2017 | Dube |

FOREIGN PATENT DOCUMENTS

| | | |
|---|---|---|
| CN | 202494586 U | 10/2012 |
| CN | 103293151 A | 9/2013 |
| EP | 2907563 A1 | 8/2015 |
| JP | 2003240688 A | 8/2003 |
| JP | 2009122001 A | 6/2009 |
| JP | 2014069147 A | 4/2014 |
| JP | 2018008188 A | 1/2018 |

(Continued)

*Primary Examiner* — Robert R Raevis

(57) ABSTRACT

A gas sampling trap includes a first stage and a second stage. The first stage includes a metal salt that reacts with sulfurous species to produce acidic gas. The second stage configured to receive the acidic gas produced in the first stage. An adsorbent substrate in the second stage adsorbs the acidic gas. A method of sampling a gas includes directing gas onto a metal stage within a first stage to produce acidic gas, directing the acidic gas into the second stage, and adsorbing the acidic gas in the second stage with an adsorbent substrate. A method of detecting a concentration of sulfurous species in a gas includes sampling the gas with a sampling trap, desorbing adsorbed acidic gas from an adsorbent substrate of the sampling trap with a solvent, and testing the solvent with ion chromatography.

15 Claims, 5 Drawing Sheets

(56) References Cited

FOREIGN PATENT DOCUMENTS

| | | | |
|---|---|---|---|
| KR | 101574926 | B1 | 12/2015 |
| WO | 2009086304 | A1 | 7/2009 |

MULTISTAGE GAS SAMPLING TRAP AND DETECTION OF SULFUROUS SPECIES CONTAMINANT

CROSS-REFERENCE TO RELATED APPLICATIONS

This application is a continuation of U.S. patent application Ser. No. 17/737,627, filed May 5, 2022, which claims the benefit under 35 USC 119 of U.S. Provisional Patent Application No. 63/185,812 filed May 7, 2021, the disclosures of which are hereby incorporated herein by reference in their entirety.

FIELD

This disclosure relates to sampling of gas for contaminants. In particular, this disclosure relates to sampling traps used in sampling gas to detect for sulfurous contaminants.

BACKGROUND

Gas sampling can be used in chemical processing, semiconductor manufacturing, gas distribution, and the like to detect for contaminant in a stream of gas. In particular, gas sampling can be used to detect for airborne micro-contaminants in a stream of gas. Examples of gas streams that may be sampled can include, but are not limited to filtered air (e.g., clean dry air, and the like), ambient air, purified nitrogen, and purified hydrogen. Canister sampling fills a sampling canister with a sample of gas. Gas sampling traps can be configured to contain just the particular compound(s) of interest within the sampling trap. The contents of a sample canister or a gas sampling trap can be used to determine the concentration of the contaminant in the sampled gas.

BRIEF SUMMARY

In an embodiment, a gas sampling trap includes a first stage and a second stage. The first stage includes an inlet for receiving a flow of gas and a metal salt. The metal salt is configured to react with sulfurous species contained in the gas to produce an acidic gas. The second stage is fluidly connected to the first stage such that the acidic gas produced in the first stage flows into the second stage. The second stage includes an adsorbent substrate that is configured to adsorb the acidic gas flowing through the second stage.

In an embodiment, the reaction of the metal salt with the sulfurous species produces the acidic gas and a metallic sulfur compound.

In an embodiment, the metal salt includes one or more of silver nitrate, zinc acetate, and copper acetate.

In an embodiment, the sulfurous species includes one or more of hydrogen sulfide, dimethyl sulfide, dimethyl disulfide, methyl mercaptan, and a methyl sulfide compound.

In an embodiment, the acidic gas includes one or more of nitric acid and acetic acid.

In an embodiment, the adsorbent substrate adsorbs the acidic gas such that the acidic gas remains stably adsorbed to the adsorbent substrate after a period of 10 days.

In an embodiment, the adsorbent substrate is a porous polymer membrane that adsorbs the acidic gas such that the acidic gas is trapped within the porous polymer membrane.

In an embodiment, the gas contains less than 400 parts per billion of the sulfurous species.

In an embodiment, the gas is one of filtered air, ambient air, purified nitrogen, and purified hydrogen.

In an embodiment, the gas sampling trap has a capture efficiency for the sulfurous species of at least 90%.

In an embodiment, the first stage and the second stage are provided within a single housing.

In an embodiment, the gas sampling trap includes an outlet provided in the second stage and a flow path that extends from the inlet to the outlet. The flow path is configured to direct the flow of the gas through the first stage and the second stage in series and to direct the acidic gas produced in the first stage into the second stage.

In an embodiment, the gas sampling trap includes a first housing, a second housing, and a passageway that fluidly connects the first housing to the second housing. The first housing contains the first stage and includes an intermediate outlet. The second housing contains the second stage and includes an intermediate inlet. The passageway extends from the intermediate outlet to the intermediate inlet.

In an embodiment, a method is directed to sampling a gas utilizing a gas sampling trap that includes a first stage and a second stage with an adsorbent substrate. The method includes directing a flow of the gas through the first stage and the second stage in series. This directing of the flow of the gas includes directing the gas onto a metal salt within the first stage to react the metal salt with a sulfurous species in the gas to produce acidic gas. The directing of the flow of the gas also includes directing the acidic gas from the first stage into the second stage and adsorbing the acidic gas flowing through the second stage with the adsorbent substrate.

In an embodiment, the adsorbent substrate is a porous polymer membrane. The adsorbing of the acidic gas flowing through the second stage includes trapping the acidic gas within the porous polymer membrane.

In an embodiment, a method is directed to detecting a concentration of sulfurous species in a gas. The method includes the sampling of the gas utilizing the gas sampling trap, disconnecting the gas sampling trap from a sampling manifold, and directing a solvent through the second stage to desorb the adsorbed acidic gas from the adsorbent substrate into the solvent. The method also includes testing the solvent containing the desorbed acidic gas with ion chromatography to determine the concentration of the sulfurous species in the gas.

DRAWINGS

Like numbers represent like features.

DETAILED DESCRIPTION

This disclosure is directed to sampling of gas for contaminant. In particular, this disclosure relates to gas traps used in sampling gas to detect for contaminant. For example, gas sampling traps herein are configured to sample for airborne micro-contaminants in a gas.

Figure 1:
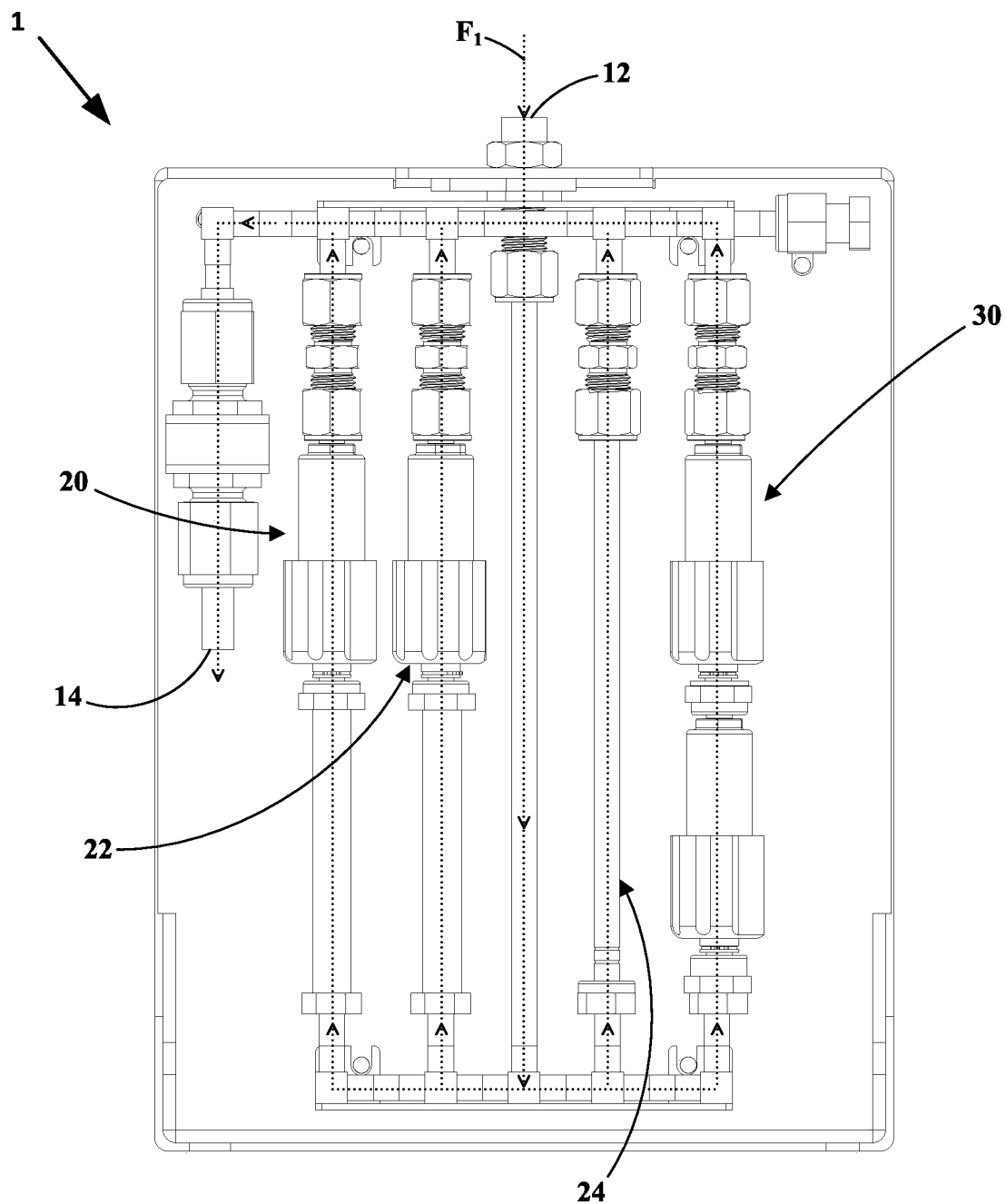
FIG. 1 is a top view of an embodiment of a gas sampling system.

FIG. 1 is a top view of a gas sampling system 1. The gas sampling system 1 includes a sampling manifold and a plurality of gas sampling traps 20, 22, 24, 30. The gas sampling system 1 can sample for one or more contaminants in a gas stream. The sampling manifold has a manifold inlet 12 and a manifold outlet 14, and gas flows through the sampling manifold from the manifold inlet 12 to the manifold outlet 14. The gas to be sampled $F_1$ is supplied to the manifold inlet 12. The gas $F_1$ flows through the gas sampling system 1 and is discharged from the outlet 14. Dotted arrows are provided in the Figures to illustrate the flow of gas. For example, FIG. 1 includes dotted arrows to illustrate the flow of the gas $F_1$ through the gas sampling system 1. The gas sampling traps 20, 22, 24, 30 are connected in parallel within the sampling manifold. The gas $F_1$ flows through the gas sampling traps 20, 22, 24, 30 in parallel as it flows from through the sampling manifold from the manifold inlet 12 to the manifold outlet 14. For example, a respective portion of the gas $F_1$ is directed to flow through each gas sampling trap 20, 22, 24, 30.

The gas sampling traps 20, 22, 24, 30 can sample for various components in the gas $F_1$. The gas sampling trap 30 is configured to sample for sulfurous species in the gas $F_1$, as discussed in more detail below. The gas sampling traps 20, 22, 24, 30 are configured to be non-destructibly disconnectable (e.g., unscrewed, etc.) from the sampling manifold. For example, this allows for easy removal of a gas sampling trap for testing of its contents. In the illustrated embodiment, the gas sampling system 1 includes four gas sampling traps 20, 22, 24, 30. However, it should be appreciated that the gas sampling system 1 in other embodiments may have one or more gas sampling traps. In some embodiments, the gas sampling trap 30 may be employed without the sampling manifold. For example, the gas sampling trap 30 may be directly connected to a gas source (not shown) without a sampling manifold.

Figure 2:
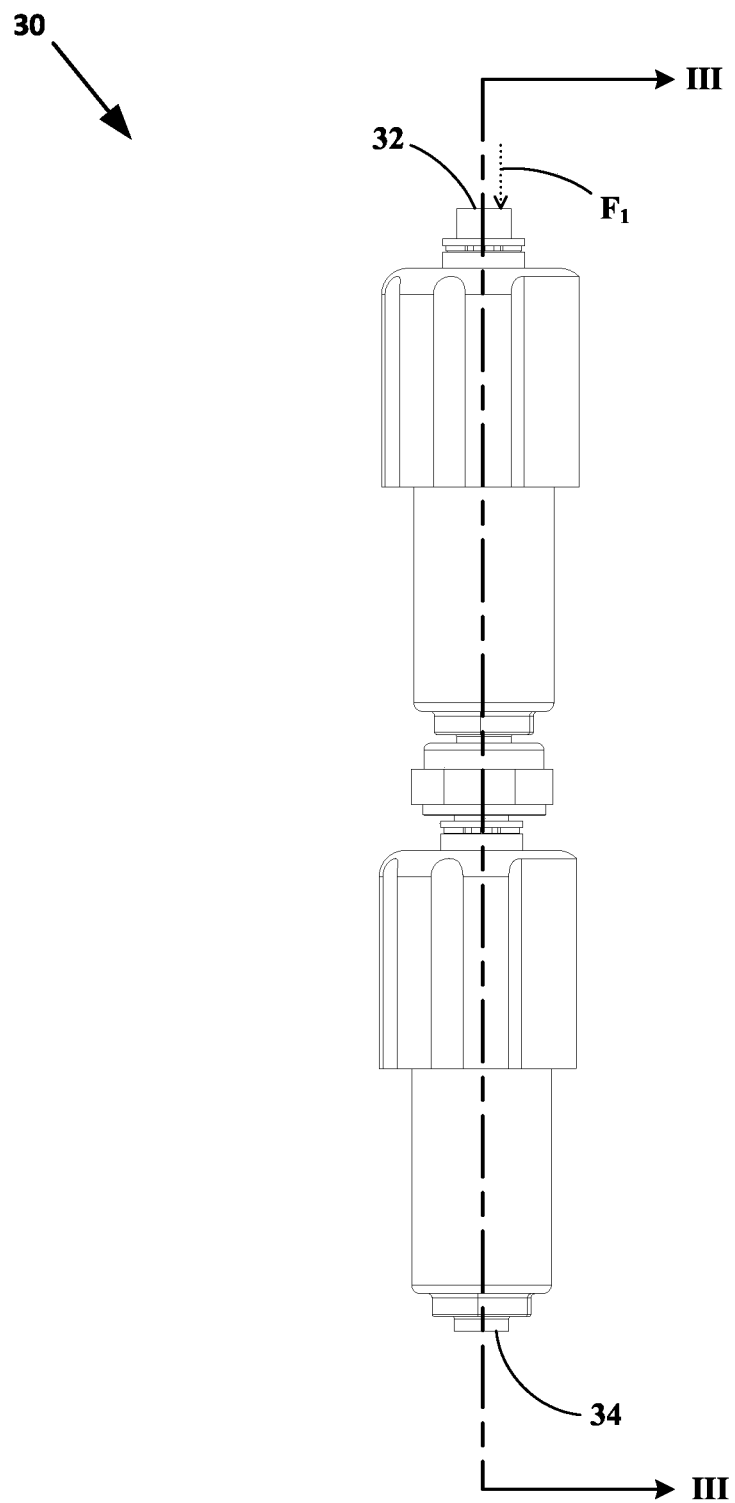
FIG. 2 is a top view of a gas sampling trap of the gas sampling system in FIG. 1, according to an embodiment.

FIG. 2 is a top view of the sample trap 30, according to an embodiment. The sampling trap 30 includes an inlet 32 and an outlet 34. Gas flows through the sampling trap 30 by entering through the inlet 32 and exiting through the outlet 34. A flow of the gas to be sampled $F_1$ by the sampling trap 30 (which can be referred to as the "sample gas") is supplied to the inlet 32 of the sampling trap 30. For example, the sampling manifold provides the flow of the sample gas $F_1$ to the inlet 32 of the sampling trap 30.

Figure 3:
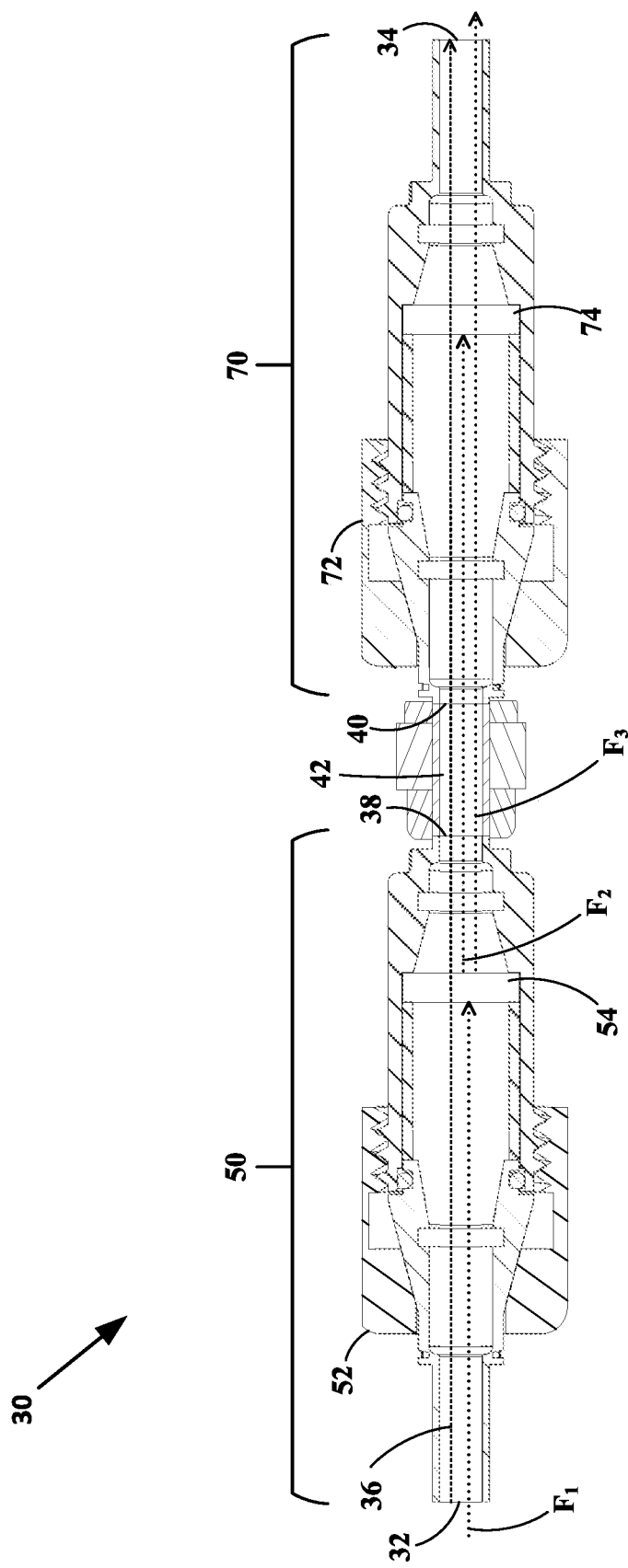
FIG. 3 is a longitudinal cross-sectional view of the gas sampling trap in FIG. 2, according to embodiment.

FIG. 3 is a longitudinal cross-sectional view of the sample trap 30, according to an embodiment. The cross-sectional view in FIG. 3 is along the line III-III indicated in FIG. 2. The sampling trap 30 is a multistage sample trap. As shown in FIG. 3, the sampling trap 30 includes a first stage 50 and a second stage 70. The first stage 50 and the second stage 70 are fluidly connected in series. The sampling trap 30 has a flow path 36 that extends from the inlet 32 to the outlet 34. The sample gas $F_1$ flows through the sampling trap 30 by flowing from its inlet 32 to its outlet 34 through the flow path 36. The flow path 36 directs the flow of sample gas $F_1$ from the inlet 32 through the first stage 50, from the first stage 50 to the second stage 70, and through the second stage 70 to the outlet 34.

In the illustrated embodiment, the sampling trap 30 includes a first housing 52 that contains the first stage 50 and a second housing 72 that contains the second stage 70. The housings 52, 72 can be made of a rigid, chemically inert polymer such as polyether ether ketone (PEEK), ultrahigh molecular weight polyethylene (UHMWPE), and the like.

As shown in FIG. 3, the first stage 50 includes the first housing 52, and the second stage 70 includes the second housing 72. The sampling trap 30 includes an intermediate outlet 38 and an intermediate inlet 40 disposed between the inlet 32 and the outlet 34 in the flow path 36. The first stage 50 includes the inlet 32 and the intermediate outlet 38 (e.g., the first housing 52 includes the inlet 32 and the intermediate outlet 38). The second stage 70 includes the intermediate inlet 40 and the outlet 34 (e.g., the second housing 72 includes the intermediate inlet 40 and the outlet 34). The sampling trap 30 includes a passageway 42 that connects the first housing 52 to the second housing 72. The passageway 42 extends from the intermediate outlet 38 to the intermediate inlet 40 (e.g., directly attaching the intermediate outlet 38 to the intermediate outlet 40). The passageway 42 may be a separate piece from the first and second housings 52, 72 or integral to one or both of the first and second housings 52,72.

The first stage 50 contains a metal salt. The first stage 50 includes a substrate 54 with the metal salt. The sample gas $F_1$ contacts the metal salt as it flows through the first stage 50. The metal salt is configured to react with sulfurous species in the sample gas $F_1$ to produce acidic gas. In an embodiment, the acidic gas is a water-soluble organic acid. The acidic gas produced by the reaction of the metal salt and the sulfurous species can include, for example, one or more of nitric acid and acetic acid. The term "sulfurous species" can refer to a single sulfur-containing compound or to a plurality of sulfur-containing compounds. The sulfurous species in the sample gas $F_1$ is/are gaseous.

In particular, the metal salt is configured to react with reactive sulfurous species present in the sample gas $F_1$. For example, such sulfurous species can include one or more of hydrogen sulfide ($H_2S$), dimethyl sulfide (($CH_3)_2S$), dimethyl disulfide ($CH_3SSCH_3$), methyl mercaptan ($CH_3SH$), and a methyl sulfide compound ($RSCH_3$). In an embodiment, the methyl sulfide compound is a gaseous methyl sulfide compound. The gaseous methyl sulfide compound includes compounds in which the R group is an alkyl group. In an embodiment, sulfurous species include one or more of hydrogen sulfide, dimethyl sulfide, dimethyl disulfide, and methyl mercaptan. Reactive sulfurous species do not include stable sulfurous species which are generally considered in the art to be chemically inert. Examples of stable gaseous sulfurous species (i.e., gaseous sulfurous species that are not reactive sulfurous species) include sulfur dioxide ($SO_2$), sulfur hexafluoride ($SF_6$), and the like.

The metal salt is configured to react with sulfurous species present in the sample gas $F_1$ to produce the acidic gas and a metallic sulfur compound. The metal salt can include, for example, one or more of silver nitrate, zinc acetate, and copper acetate. The metallic sulfur compound is a by-product of producing the acidic gas. In an embodiment, the metallic compound is a solid metallic compound formed on the substrate 54. The following Equation (I) is an example of one embodiment of the acidic gas producing reaction.

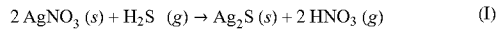

$$2\,AgNO_3\,(s) + H_2S\,(g) \rightarrow Ag_2S\,(s) + 2\,HNO_3\,(g) \qquad (I)$$

In the illustrated embodiment, the substrate 54 is a coated porous polymer membrane. The polymer membrane can be made of a rigid polymer material such as sintered high density polyethylene (HDPE), sintered polytetrafluoroethylene (PTFE), and the like. The metal salt is provided on the surfaces of the porous membrane (e.g., the surfaces of the pores of the porous membrane). In an embodiment, a solution of the metal salt and a solvent (e.g., non-polar solvent, water, etc.) is applied to the polymer membrane material and dried. The solvent evaporates forming a coating of the metal salt on the surfaces of the polymer membrane material (e.g., external surfaces of the membrane, internal pore surfaces of the membrane). As shown in FIG. 3, the sample gas $F_1$ flows through the porous substrate 54 as it flows through the first stage 50. For example, the sample gas $F_1$ contacts the metal salt as it flows through the pores of the porous coated membrane. In another embodiment, the substrate 54 may be in the form of coated powder or coated granules. For example, the coated powder/coated granules can be formed of inert particles/granules (e.g., HDPE powder/granules, PTFE powder/granules, silica gel, etc.) that are coated with the metal salt.

The mixture of the acidic gas $F_2$ and remaining sample gas $F_3$ (e.g., the sample gas $F_1$ minus the consumed sulfurous species) flows out of the first stage 50. The acidic gas $F_2$ and sample gas $F_3$ flow from the first stage 50 to the second stage 70. As shown in FIG. 3, the second stage 70 is fluidly connected to the first stage 50 such that the acidic gas $F_2$ produced in the first stage 50 flows into the second stage 70. The acidic gas $F_2$ and sample gas $F_3$ flow from the first housing 52 through the passageway 42 into the second housing 72.

The second stage 70 contains an adsorbent substrate 74. The mixture of acidic gas and sample gas $F_2$, $F_3$ contacts the adsorbent substrate 74 as the mixture flows through the second stage. The adsorbent substrate 74 is configured to adsorb acidic gas $F_2$. The acidic gas $F_2$ is adsorbed to the adsorbent substrate 74 as it flows through the second stage 70. The acidic gas $F_2$ being adsorbed from the mixture of acidic gas $F_2$ and sample gas $F_3$ by the adsorbent substrate 74 as the mixture flows through the second stage 70.

The adsorbent substrate 74 is a substrate that adsorbs the acidic gas produced in the first stage 50. In an embodiment, the adsorbent substrate 74 is a coated porous polymer membrane. The polymer membrane is made of a polymer material. The polymer membrane can be made of a rigid polymer material such as sintered high density polyethylene (HDPE), sintered polytetrafluoroethylene (PTFE), and the like. The polymer material of the absorbent substrate 74 may be a hydrophobic polymer material or a hydrophilic polymer material.

The coating can include a metal salt that attracts and adsorbs the acidic gas as it flows through the second stage 70. The metal salt attracting and adsorbing the acidic gas $F_2$ as it flows through the pores of the adsorbing substrate 74. The metal salt can include one or more earth metal salts of carbonate, bicarbonate, and/or hydroxide. The metal salt can include, for example, one or more of sodium hydroxide (NaOH), sodium bicarbonate ($NaHCO_3$), sodium carbonate ($Na_2CO_3$), potassium hydroxide (KOH), and the like.

In an embodiment, a solution of the metal salt and solvent (e.g., a non-polar solvent) is applied to the polymer membrane material and then dried. The solvent evaporates forming a coating of the metal salt on the surfaces of the polymer membrane material (e.g., external surfaces of the polymer membrane, internal pore surfaces of the polymer membrane). In another embodiment, the absorbent substrate 74 may be in the form of coated powder or coated granules. For example, the coated powder/coated granules can be formed of inert particles/granules (e.g., HDPE powder/granules, PTFE powder/granules, silica gel, etc.) that are coated with the adsorbent coating (e.g., the metal salt coating, etc.).

In the illustrated embodiment, the adsorbent substrate 74 is a porous membrane. The mixture of acidic gas and sample gas $F_2$, $F_3$ are directed through the porous adsorbent substrate 74. The sample gas $F_3$ passes through the adsorbent substrate 74 while the acidic gas $F_2$ is adsorbed within the adsorbent substrate 74. The acidic gas $F_2$ becomes trapped within the porous membrane. The sample gas $F_3$ flows through the porous adsorbent substrate 74 and then flows out of the second stage 70 (e.g., the sample gas $F_3$ flows from the adsorbent substrate 74 out of the second housing 72 and the sampling trap 30 through the outlet 34).

The adsorbent substrate 74 is configured to adsorb the acidic gas $F_2$ in a stable manner. The adsorbed acidic gas $F_2$ remains stable for a significantly longer period than conventional sampling that contains the reactive sulfurous species (e.g., canister sampling). For example, in conventional canister sampling, a gas sample is kept within a sealed canister/vessel and the sulfurous species react/breakdown due to its reactivity with trace moisture and the material(s) of the container/vessel. The acidic gas $F_2$ remains stably adsorbed to the adsorbent substrate 74 after a period of at least 10 days. In an embodiment, the acidic gas $F_2$ remains stably adsorbed to the adsorbent substrate 74 after a period of at least 14 days. In an embodiment, the acidic gas $F_2$ remains stably adsorbed to the adsorbent substrate 74 after a period of 21 days. In experimentation of embodiments of the multistage trap 30, the chemical adsorption between the metal salt adsorbent substrate 74 and the acidic gas $F_2$ has resulted in the acidic gas $F_2$ remaining stably adsorbed 21 days after being adsorbed. In this context, "stably adsorbed" means that at least 90% of the adsorbed acidic gas remains adsorbed after storing the sealed second stage at ambient temperature for the specified period of time.

The gaseous sampling trap 30 is used for detecting sulfurous species contaminant in a gas $F_1$. In an embodiment, the gaseous sampling trap 30 is employed in the gas sampling system 1 to sample filtered air, ambient air, purified nitrogen, or purified hydrogen. For example, purified nitrogen contains at least 99% nitrogen and is suitable as an inert gas for use in semiconductor manufacturing. For example, the purified hydrogen contains at least 99% hydrogen and is suitable for use in hydrogen fuel cells. For example, the filtered air is air filtered to have reduced corrosion of electronic equipment in data centers and control rooms (e.g., clean dry air, etc.).

The gas sampling trap 30 is configured to sample gas $F_1$ that contains less than 1 part per million of sulfurous species. In some embodiments, gas sampling trap 30 is configured to sample gas $F_1$ that contains less than 400 parts per billion of the sulfurous species, such as less than 100 parts per billion. In an embodiment, the gas sampling trap 30 is configured to sample gas $F_1$ that contains less than 10 parts per billion of the sulfurous species. In an embodiment, the gas sampling trap 30 is configured to sample gas $F_1$ that contains less than 10 parts per billion of the sulfurous species. During testing, embodiments of the gas sampling trap 30 were effective in detecting sulfurous species down to 100 parts per trillion. Parts per a million/billion/trillion as discussed herein is in volume to volume (e.g., volume of sulfurous per volume of the sampled gas). In some embodiments, a gas sampling trap 30 can be configured to accommodate for greater concentrations of sulfurous species (e.g., by adjusting the sampling time accordingly, concentration of metal salt, etc.).

Figure 4:
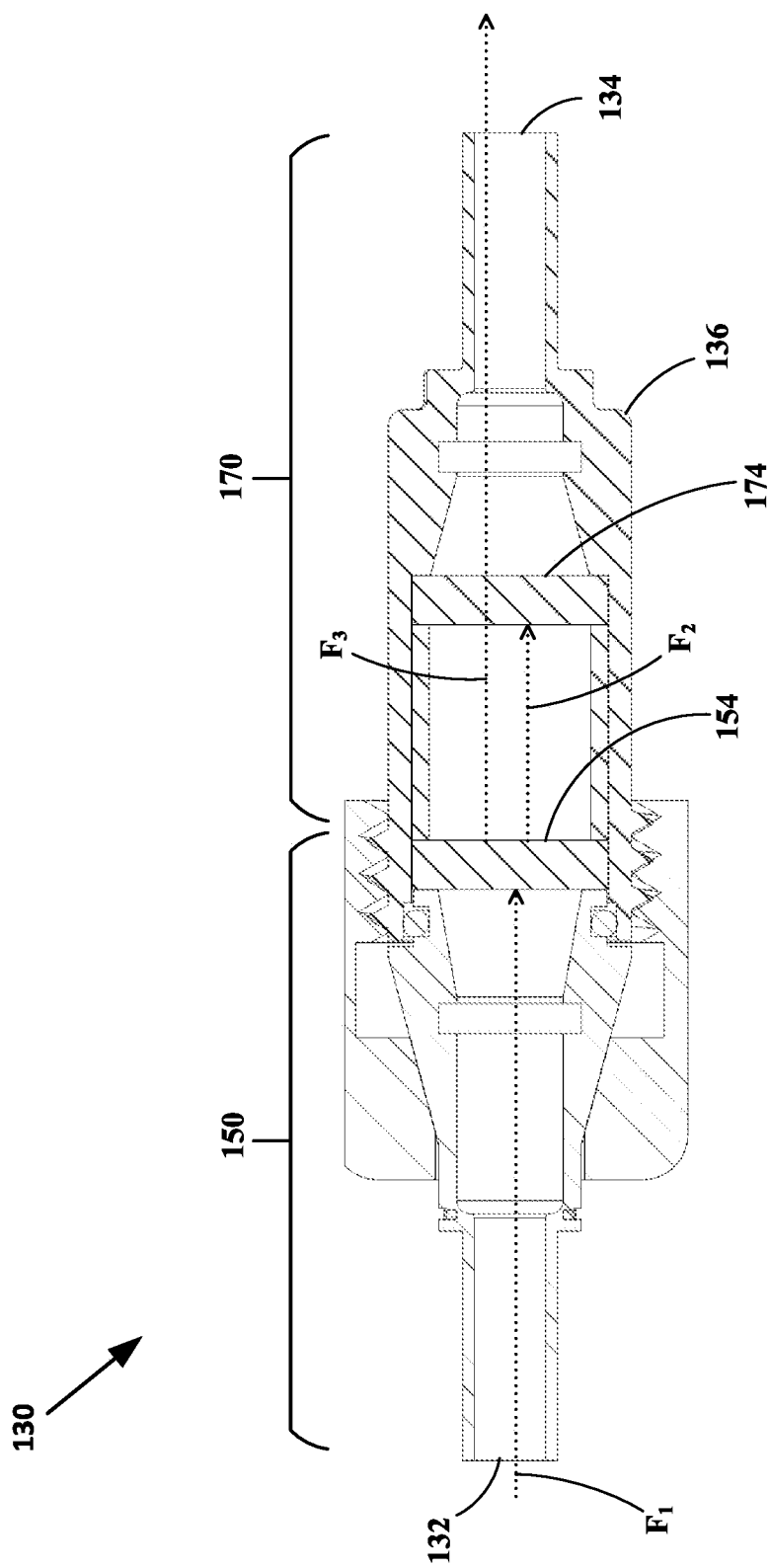
FIG. 4 is a longitudinal cross-sectional view of an embodiment of a gas sampling trap.

FIG. 4 is a cross-section of another embodiment of a sampling trap. The illustrated cross-section of the sampling trap 130 is a lengthwise bi-section of a sampling trap similar to the cross-section illustrated in FIG. 3 of sampling trap 30. The sampling trap 130 is a multistage sampling trap for sulfurous species. The sampling trap 130 is used for measuring the concentration of reactive sulfurous species in a sample gas similar to the sampling trap 30 in FIGS. 1-3. In an embodiment, the sampling trap 130 is employed in a gas sampling system (e.g., gas sampling system 1). The sampling trap 130 may be connected into the sampling manifold of the gas sampling system (e.g., sampling manifold). In an embodiment, the sampling trap 130 may be used instead of the sampling trap 30 in the gas sampling system 1 of FIG. 1.

As shown in FIG. 4, the sampling trap 130 includes an inlet 132, an outlet 134, a first stage 150, and a second stage 170. The sampling trap 130 generally functions in a similar manner to the sampling trap 30 in FIG. 3. For example, a flow of sample gas $F_1$ is supplied to the inlet 132 of the sampling trap 130, flows through the sampling trap 132 by flowing through the first stage 150 and the second stage 170 in series, and then out of the sampling trap 130 through the outlet 134. The first stage 150 and the second stage 170 of the sampling trap 130 function in a manner similar as described above for the first stage 50 and the second stage 70 of the sampling trap 30 in FIG. 3. The first stage 150 contains a metal salt (e.g., included in the substrate 154 of the first stage 150) that reacts with sulfurous species in the sample gas $F_1$ to produce acidic gas $F_2$. The mixture of produced acidic gas $F_2$ and the sample gas $F_3$ (e.g., the sample gas $F_1$ minus the consumed sulfurous species) flow into the second stage 170, and the acidic gas is adsorbed by an adsorbent substrate 174 in the second stage 170. The metal salt, substrate 154, and adsorbent substrate 174 in the sampling trap 130 can have similar features as discussed above for the metal salt, substrate 54, and the adsorbent substrate 74 of the sampling trap 30.

As shown in FIG. 4, the sampling trap 130 includes a single housing 136. First stage 150 and the second stage 170 are provided within the single housing 136. The metal salt (e.g., the substrate 154 with the metal salt) and the adsorbent substrate 174 are contained within the same housing 136. Within the housing 136, the metal salt substrate 154 is disposed between the inlet 132 of the housing 136 and the adsorbent substrate 174, and the adsorbent substrate 154 is disposed between the metal salt (e.g., the substrate 154 with the metal salt) and the outlet 134 of the housing 136. In the flow path of the sampling trap 130, the metal salt (e.g., the substrate 154 with the metal salt) and the adsorbent substrate 174 are downstream of the inlet 132, and the adsorbent substrate 174 is downstream of the metal salt such that the acidic gas produced in the first stage 150 flows into the second stage 170. For example, the flow of sample gas $F_1$, $F_3$ through the sampling trap 130 causes the acidic gas $F_2$ produced at the metal salt substrate 154 to flow to the adsorbent substrate 174 in the second stage 170.

Figure 5:
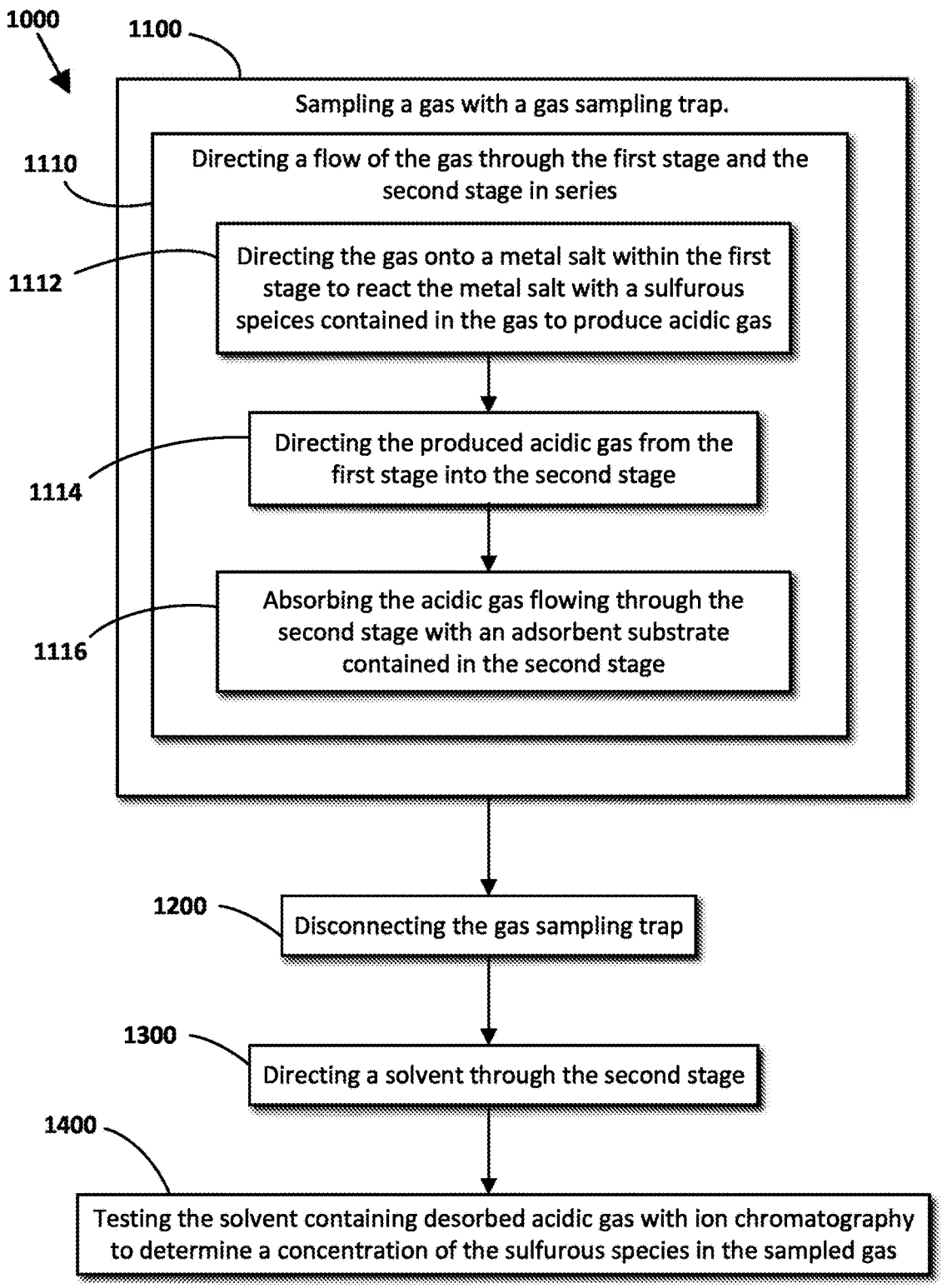
FIG. 5 is a block flow diagram of a method of detecting a concentration of sulfurous species in a gas.

FIG. 5 shows a block flow diagram of a method 1000 of detecting a concentration of sulfurous species within a gas. The method starts at 1100. At 1100, a gas (e.g., sample gas $F_1$) is sampled with a gas sampling trap. For example, the gas sampling at 1100 may utilize the gas sampling trap 30 in FIGS. 1-3 or the gas sampling trap 130 in FIG. 4. The gas sampling at 1110 can employ the gas sampling trap to sample the gas in a sampling manifold (e.g., sampling manifold 10). The gas is sampled by the gas sampling trap at 1110 for an amount of time (e.g., one shift, 6 hours, 8 hours, etc.). The gas sampling trap includes a first stage (e.g., first stage 50, first stage 150) and a second stage (e.g., second stage 70, 170).

The gas sampling at 1100 can include directing a flow of the gas through the first stage and the second stage in series 1110. The directing of the flow of the gas at 1110 includes 1112, 1114, and 1116. The directing of the flow of the gas 1110 starts at 1112. At 1112, the gas is directed onto a metal salt within the first stage to react the metal salt with a sulfurous species contained in the gas to produce acidic gas (e.g., acidic gas $F_2$). In an embodiment, the second stage may include a substrate with the metal salt (e.g., substrate 54, substrate 154), and directing the gas onto the metal salt 1112 can include directing the gas through the substrate (e.g., through a metal salt coated polymer membrane). The method 1000 then proceeds to 1114.

At 1114, the acidic gas produced in the first stage is directed to the second stage. The method 1000 then proceeds to 1116.

At 1116, the acidic gas flowing through the second stage is adsorbed by an adsorbent substrate (e.g., adsorbent substrate 74, adsorbent substrate 174) contained in the second stage. In an embodiment, the adsorbent substrate is a porous polymer membrane and the adsorption of the acidic gas at 1116 can include trapping the acidic gas within the polymer membrane. The method 1100 the proceeds to 1200.

At 1200, the sampling trap is disconnected. In an embodiment, disconnecting the sampling trap 1200 includes disconnecting the sampling trap from the sampling manifold (e.g., sampling manifold). In another embodiment, disconnecting the sampling trap 1200 includes disconnecting the sampling manifold 1200 from a gas source (e.g., disconnecting the manifold inlet 12 and the manifold outlet 14 from a gas source). In another embodiment, disconnecting the sampling trap 1200 includes disconnecting the sampling trap from a gas source (e.g., disconnecting the inlet 32 and the outlet 34 of the sampling trap from a gas source). The disconnected sampling trap or disconnected sampling manifold (which includes the sampling trap) can then be transported to an off-site testing facility such as a testing lab. Disconnecting the sampling trap 1200 can include sealing the inlet and outlet of the disconnected sampling trap or disconnected sampling manifold (e.g., capping the inlet 32 and the outlet 34, capping the manifold inlet 12 and the manifold outlet 14). For example, this can prevent contamination of the sampling trap during transport. In an embodiment, the steps after 1200 are performed off-site from the location at which the sampling 1100 occurs. The method 1000 then proceeds to 1300.

At 1300, a solvent is directed through the second stage. For example, the solvent is passed through the porous adsorbent substrate disposed in the second stage. The adsorbent substrate is configured to adsorb the acidic gas in a manner that allows for solvent to desorb the adsorbed acidic gas. The solvent can include a liquid polar solvent (e.g., water, methanol, etc.) that desorbs the adsorbed acidic gas from the adsorbent substrate. For example, the solvent disrupts the adsorption/attraction between the adsorbed acidic acid and the adsorbent substrate. After being directed through the second stage, the solvent contains the desorbed acidic gas. For example, the desorbed acidic gas is a liquid (e.g., liquid acetic acid, liquid nitric acid, etc.) and is contained in the solvent by mixing with the solvent. The method 1000 then proceeds to 1400.

At 1400, the solvent containing the desorbed acidic gas is tested with ion chromatography to determine a concentration of the sulfurous species in the sampled gas. Testing the solvent containing the desorbed acidic acid with ion chromatography at 1400 includes testing the solvent with ion chromatography to determine the amount of the desorbed acidic gas contained in the solvent (e.g., concentration of desorbed acidic acid in the solvent×total amount of solvent). The amount of desorbed acidic gas in the solvent corresponds with the amount of acidic gas adsorbed by the adsorbent substrate at 1116 (e.g., the amount of desorbed acidic gas=the amount of acidic acid adsorbed by the adsorbent substrate). The amount of adsorbed acidic gas can be used to calculate the total amount of the sulfurous species consumed from the sampled gas (e.g., 1 mol of the sulfurous species produces 1 mol of the acidic gas, etc.). The concentration of the sulfurous species in the sampled gas can be calculated based on the total amount of consumed sulfurous species and known volume of the gas sampled at 1100 (e.g., amount of the consumed sulfurous species/amount of the gas sampled, volume of the consumed sulfurous species/volume of the gas sampled). For example, the volume of the gas sampled at 1100 is known based on being documented, having standardized sampling conditions (e.g., standard sampling time, flow rate, pressure, etc.), or the sampling conditions being documented.

The stability of the adsorbed acidic gas permits longer times between the sampling at 1100 and the testing of the sampling trap at 1300 and 1400 without a significant loss in accuracy. For example, the stability allows for situations in which it takes longer to transport the sampling trap from the sampling location to a testing facility (e.g., international shipping, non-expedited shipping, shipping delays, etc.). International shipping of a sampling trap can routinely can more than 10 days and can take longer than 14 days in many situations.

Capture efficiency (CE) of a sampling trap can be determined using Equation (II):

$$CE = \left(\frac{\text{Expected Sulfurous Species Concentration based on Measured Absorbed Acidic Gas}}{\text{Known Concentation of Sulfurous Species in Gas Sample}}\right) \quad (II)$$

For example, the "expected sulfurous species concentration based on measured adsorbed acidic gas" in Equation (II) can be the amount of absorbed acidic gas as measured by ion chromatography with chemo-luminescence. The "known concentration of sulfurous species in gas sample" in Formula (II) can be measured gravimetrically. Alternatively, capture efficiency may also be determined using Equation (III):

Capture Efficiency(CE) =

$$\left(1 - \frac{\text{Conc of sulfurous species}_{Downstream}}{\text{Conc of sulfuorous species}_{Uptream}}\right) \times 100 \ (\%)$$

Capture efficiency measures the performance of a sampling trap and compares the amount of sulfurous species captured by the trap relative to the amount in the gas stream that passes through the trap. For example, the sampling trap 30 has been found to have an initial capture efficiency of at least 90%, at least 91%, at least 92%, at least 93%, at least 94%, or at least 95%. In testing, embodiments of the multistage sampling trap 30 had an initial capture efficiency of at least 93.3%. Tested embodiments of the multistage sampling trap 30 utilized a silver nitrate coated porous membrane or a silver nitrate coated silica gel for the substrate 54 in the first stage 50 and a sodium hydroxide or potassium hydroxide coated hydrophobic membrane for the adsorbent substrate 74.

Sample traps have a finite capacity, which relates to how many hours the sample trap is capable of sampling, and capture efficiency gradually decreases over time as the sample trap captures the contaminants. For this reason, the capacity of a sample trap is often defined at a particular capture efficiency, which serves as a practical operating limit. More specifically, capacity is defined as the absolute amount by weight of contaminant (i.e., the sulfurous species) that a sample trap can hold and has typical units of parts per billion hours (ppb-hrs)—the product of time and challenge concentration. Capacity can depend on, for example, concentration, flow, temperature, and relative humidity, and may further depend on the chemical or physical interaction between the contaminant and the sample trap medium, such as the treatment concentration.

Typically, capacity is defined at a particular capture efficiency. For example, the sample traps disclosed herein have been found to have a capacity of at least 100 ppb-hr at 90% capture efficiency, such as at least 150 ppb-hrs, at least 200 ppb-hrs, or at least about 250 ppb-hrs at 90% capture efficiency.

As specific examples, a gaseous stream having a known concentration of hydrogen sulfide ($H_2S$) was introduced into the inlet of the housing of a sample trap in which a silver nitrate treated porous frit was inserted. The hydrogen sulfide gas stream was allowed to pass from the inlet of the housing through the treated frit where a reaction occurred with the silver nitrate to produce a silver sulfide effluent. The effluent then exited the outlet of the housing, and the outlet sulfur concentration was recorded every fifteen minutes. The capacity was then calculated using Equation (III). Results are shown in Table 1 below.

TABLE 1

| Sample Trap 1 | Sample Trap 2 | Sample Trap 3 |
|---|---|---|
| 0.1M $AgNO_3$ | 0.1M $AgNO_3$ | 0.5M $AgNO_3$ |
| <10% RH | 45% RH | <10% RH |
| 100 | 100 | 250 |

Capacity values were recorded at 9-% capture efficiency (ppb-hrs). As the data shows, the capacity of the sample trap was found to be independent of the relative humidity of the gas stream (measured using a calibrated hydrometer). However, the higher the silver nitrate treatment, the higher the sample trap capacity.

The accuracy and precision of sulfurous gas concentration values relative to the actual concentration values were also determined. In this example, known concentrations of hydrogen sulfide were generated and passed through sample traps that included a silver nitrate treated porous frit. The resulting effluent was then measured by Ion Chromatography. The average calculated hydrogen sulfide values (ppb-volume) were then compared to the known values. The results are shown in Table 2.

TABLE 2

| Known Conc | Measured Conc (ppb-V) | | | | Margin of Error | Uncertainty @99% |
|---|---|---|---|---|---|---|
| (ppb-V) | Ave | Accuracy | Precision | RPD (%) | @99% | (ppb-V) |
| 1.4 | 1.4 | 97% | 0.09 | 7.0 | 6.6 | 0.3 |
| 2.9 | 3.0 | 105% | 0.2 | 5.1 | 6.2 | 0.8 |
| 6.6 | 6.3 | 96% | 0.4 | 5.9 | 6.5 | 1.9 |

TABLE 2-continued

| Known Conc | Measured Conc (ppb-V) | | | Margin of Error | Uncertainty @99% |
|---|---|---|---|---|---|
| (ppb-V) | Ave | Accuracy | Precision | RPD (%) | @99% | (ppb-V) |
| 17 | 15 | 93% | 0.3 | 1.9 | 2.0 | 1.4 |
| 29 | 30 | 101% | 1.1 | 3.7 | 4.3 | 5.4 |
| 67 | 63 | 93% | 1.5 | 2.4 | 2.6 | 7.5 |

Aspects:

Any of Aspects 1-13 can be combined with any of Aspects 14-20.

Aspect 1. A gas sampling trap, comprising: a first stage including an inlet for receiving a flow of gas, the first stage containing a metal salt configured to react with sulfurous species contained in the gas to produce an acidic gas; and a second stage fluidly connected to the first stage such that the acidic gas produced in the first stage flows into the second stage, the second stage containing an adsorbent substrate configured to adsorb the acidic gas flowing through the second stage.

Aspect 2. The gas sampling trap of Aspect 1, wherein the reaction of the metal salt with the sulfurous species produces the acidic gas and a metallic sulfur compound.

Aspect 3. The gas sampling trap of either one of Aspects 1 or 2, wherein the metal salt includes one or more of silver nitrate, zinc acetate, and copper acetate.

Aspect 4. The gas sampling trap of any one of Aspects 1-3, wherein the sulfurous species includes one or more of hydrogen sulfide, dimethyl sulfide, dimethyl disulfide, methyl mercaptan, and a methyl sulfide compound.

Aspect 5. The gas sampling trap of any one of Aspects 1-4, wherein the acidic gas includes one or more of nitric acid and acetic acid.

Aspect 6. The gas sampling trap of any one of Aspects 1-5, wherein the adsorbent substrate adsorbs the acidic gas such that the acidic gas remains stably adsorbed to the adsorbent substrate after a period of 10 days.

Aspect 7. The gas sampling trap of any one of Aspects 1-6, wherein the adsorbent substrate is a porous polymer membrane that adsorbs the acidic gas such that the acidic gas is trapped within the porous polymer membrane.

Aspect 8. The gas sampling trap of any one of Aspects 1-7, wherein the gas contains less than 400 parts per billion of the sulfurous species.

Aspect 9. The gas sampling trap of any one of Aspects 1-8, wherein the gas is one of filtered air, ambient air, purified nitrogen, and purified hydrogen.

Aspect 10. The gas sampling trap of any one of Aspects 1-9, wherein the gas sampling trap has an initial capture efficiency for the sulfurous species of at least 90%.

Aspect 11. The gas sampling trap of Aspect 10, wherein the gas sampling trap has a capacity of at least 100 ppb-hr at a capture efficiency of 90%.

Aspect 12. The gas sampling trap of any one of Aspects 1-10, wherein the first stage and the second stage are provided within a single housing.

Aspect 13. The gas sampling trap of any one of Aspects 1-11, further comprising: an outlet provided in the second stage; and a flow path extending from the inlet to the outlet, the flow path configured to direct the flow of the gas through the first stage and the second stage in series and to direct the acidic gas produced in the first stage into the second stage.

Aspect 14. The gas sampling trap of any one of Aspects 1-10 and 12, comprising: a first housing containing the first stage, the first housing including an intermediate outlet; a second housing containing the second stage, the second housing including an intermediate inlet; and a passageway fluidly connecting the first housing to the second housing, the passageway extending from the intermediate outlet to the intermediate inlet.

Aspect 15. A method of sampling a gas utilizing a gas sampling trap, the gas sampling trap including a first stage and a second stage, the method comprising: directing a flow of the gas through the first stage and the second stage in series, wherein the directing of the flow of the gas includes: directing the gas onto a metal salt within the first stage to react the metal salt with a sulfurous species contained in the gas to produce acidic gas, directing the acidic gas from the first stage into the second stage, and adsorbing, with an adsorbent substrate contained in the second stage, the acidic gas flowing through the second stage.

Aspect 16. The method of Aspect 14, wherein the metal salt includes one or more of silver nitrate, zinc acetate, and copper acetate.

Aspect 17. The method of either one of Aspects 14 and 15, wherein the acidic gas includes one or more of nitric acid and acetic acid.

Aspect 18. The method of any one of Aspects 14-16, wherein the sulfurous species includes one or more of hydrogen sulfide, dimethyl sulfide, dimethyl disulfide, methyl mercaptan, and a methyl sulfide compound.

Aspect 19. The method of any one of Aspects 14-17, wherein the adsorbent substrate adsorbs the acidic gas such that the acidic gas remains stably adsorbed to the adsorbent substrate after a period of 10 days.

Aspect 20. The method of any one of Aspects 14-18, wherein the adsorbent substrate is a porous polymer membrane wherein the adsorbing of the acidic gas includes trapping the acidic gas within the porous polymer membrane.

Aspect 21. A method of detecting a concentration of sulfurous species in a gas, the method comprising: sampling a gas utilizing a gas sampling trap according to the method of any one of Aspects 14-19; disconnecting the gas sampling trap from a sampling manifold; directing a solvent through the second stage, the solvent desorbing the acidic gas adsorbed in the adsorbent substrate into the solvent; and testing the solvent containing the desorbed acidic gas with ion chromatography to determine a concentration of the sulfurous species in the gas.

The examples disclosed in this application are to be considered in all respects as illustrative and not limitative. The scope of the invention is indicated by the appended claims rather than by the foregoing description; and all changes which come within the meaning and range of equivalency of the claims are intended to be embraced therein.

What is claimed is:

1. A gas sampling system comprising a gas sampling trap, the gas sampling trap comprising:
   a first stage including an inlet for receiving a flow of gas, the first stage containing a metal salt configured to react with sulfurous species contained in the gas to produce an acidic gas; and
   a second stage fluidly connected to the first stage such that the acidic gas produced in the first stage flows into the second stage, the second stage containing an adsorbent substrate configured to adsorb the acidic gas flowing through the second stage,
   wherein the gas sampling trap is directly connected to a gas source without a sampling manifold.

2. The gas sampling system of claim 1, wherein the reaction of the metal salt with the sulfurous species produces the acidic gas and a metallic sulfur compound.

3. The gas sampling system of claim 1, wherein the metal salt includes one or more of silver nitrate, zinc acetate, and copper acetate.

4. The gas sampling system of claim 1, wherein the sulfurous species includes one or more of hydrogen sulfide, dimethyl sulfide, dimethyl disulfide, methyl mercaptan, and a methyl sulfide compound.

5. The gas sampling system of claim 1, wherein the acidic gas includes one or more of nitric acid and acetic acid.

6. The gas sampling system of claim 1, wherein the adsorbent substrate adsorbs the acidic gas such that the acidic gas remains stably adsorbed to the adsorbent substrate after a period of 10 days.

7. The gas sampling system of claim 1, wherein the adsorbent substrate is a porous polymer membrane that adsorbs the acidic gas such that the acidic gas is trapped within the porous polymer membrane.

8. The gas sampling system of claim 1, wherein the gas contains less than 400 parts per billion of the sulfurous species.

9. The gas sampling system of claim 1, wherein the gas is one of filtered air, ambient air, purified nitrogen, and purified hydrogen.

10. The gas sampling system of claim 1, wherein the one or more gas sampling traps has an initial capture efficiency for the sulfurous species of at least 90%.

11. The gas sampling system of claim 10, wherein the one or more gas sampling traps has a capacity of at least 100 ppb-hr at a capture efficiency of 90%.

12. The gas sampling system of claim 1, wherein the first stage and the second stage of the gas sampling trap are provided within a single housing.

13. The gas sampling system of claim 1, wherein the gas sampling trap comprises:
   an outlet provided in the second stage; and
   a flow path extending from the inlet to the outlet, the flow path configured to direct the flow of the gas through the first stage and the second stage in series and to direct the acidic gas produced in the first stage into the second stage.

14. The gas sampling system of claim 1, wherein the gas sampling trap comprises:
   a first housing containing the first stage, the first housing including an intermediate outlet;
   a second housing containing the second stage, the second housing including an intermediate inlet; and
   a passageway fluidly connecting the first housing to the second housing, the passageway extending from the intermediate outlet to the intermediate inlet.

15. The gas sampling system of claim 1 comprising a plurality of gas sampling traps.

* * * * *